United States Patent [19]

Gardner et al.

[11] Patent Number: 4,760,106

[45] Date of Patent: Jul. 26, 1988

[54] IMPACT RESISTANT MATRIX RESINS FOR ADVANCED COMPOSITES

[75] Inventors: Hugh C. Gardner, Somerville; Michael J. Michno, Jr.; George L. Brode, both of Bridgewater; Robert J. Cotter, Bernardsville, all of N.J.

[73] Assignee: Amoco Corporation, Chicago, Ill.

[21] Appl. No.: 1,464

[22] Filed: Jan. 8, 1987

Related U.S. Application Data

[60] Division of Ser. No. 690,405, Jan. 15, 1985, Pat. No. 4,661,559, which is a continuation of Ser. No. 496,398, May 20, 1983, abandoned.

[51] Int. Cl.$^4$ .......................... C08K 7/00; C08K 7/04; C08K 7/14; C08L 63/00
[52] U.S. Cl. ...................... 523/433; 428/413; 428/417; 523/400; 523/442; 523/445; 523/466; 523/468
[58] Field of Search ............ 525/523, 107, 529; 523/468, 400, 433, 442, 445, 466; 428/413, 417

[56] References Cited

U.S. PATENT DOCUMENTS

| | | | |
|---|---|---|---|
| 3,819,472 | 6/1974 | Vasta | 525/523 |
| 4,115,296 | 9/1978 | Andrews | 525/523 |

FOREIGN PATENT DOCUMENTS

| | | | |
|---|---|---|---|
| 53-98400 | 8/1978 | Japan . | |
| 54-64599 | 5/1979 | Japan . | |
| 55-155703 | 12/1980 | Japan | 525/523 |
| 1306231 | 2/1973 | United Kingdom | 525/523 |

OTHER PUBLICATIONS

Sergeyev et al., *Polymer Science*, U.S.S.R., vol. 25, No. 6, pp. 1523–1529.

*Primary Examiner*—Allan M. Lieberman
*Attorney, Agent, or Firm*—Richard J. Schlott; William H. Magidson; Ralph C. Medhurst

[57] ABSTRACT

Described herein is a composition which contains a specific group of hardeners, an epoxy resin and a thermoplastic polymer. When combined with a structural fiber the composition produces composites which have improved impact resistance, improved tensile properties and high compressive properties.

6 Claims, No Drawings

IMPACT RESISTANT MATRIX RESINS FOR ADVANCED COMPOSITES

This application is a division of prior U.S. application Ser. No. 690,405 filed 1/10/85, now U.S. Pat. No. 4,661,559 which is a continuation of application Ser. No. 496,398 filed 5/20/83, now abandoned.

BACKGROUND OF THE INVENTION

Advanced composites are high strength high modulus materials which are finding increasing use as structural components in aircraft, automotive, and sporting goods applications. Typically, they comprise structural fibers such as carbon fibers in the form of woven cloth or continuous filaments embedded in a thermosetting resin matrix.

In many advanced composites, the matrix contains an epoxide resin and an aromatic amine hardener. Such composites have high compressive strengths, good fatigue characteristics, and low shrinkage during cure. However, since the matrix resins are brittle, the composites have poor impact resistance and tensile properties which do not fully translate the properties of the reinforcing fiber. Thus, there is a need for matrix resins which afford composites with improved impact resistance and tensile properties in combination with the high compressive strengths typical of this class of materials.

THE INVENTION

It has now been found that a composition which contains a specific group of hardeners, an epoxy resin and a thermoplastic polymer, when combined with a structural fiber, produces composites which have improved impact resistance, improved tensile properties and high compressive properties.

The composition of this invention comprises:
(a) a diamine hardener,
(b) an epoxy resin containing two or more 1,2-epoxide groups per molecule, and
(c) a thermoplastic polymer.

The diamine hardeners which are used in this invention are represented by the following general formula:

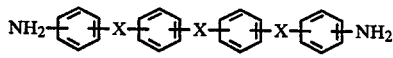

wherein the X's are independently selected from a direct bond, O, S, SO$_2$, CO, COO, C(CF$_3$)$_2$, C(R$_1$R$_2$)$_2$ wherein R$_1$ and R$_2$ are independently hydrogen or alkyl of 1 to 4 carbon atoms.

The preferred hardeners are selected from one or more of the following compounds:

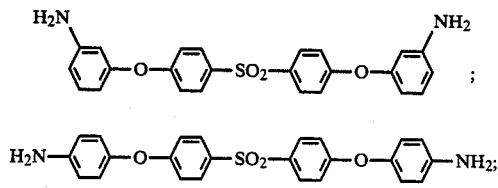

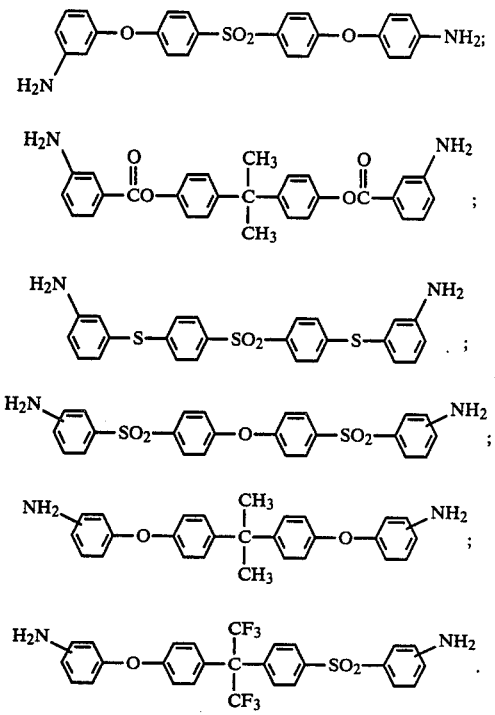

These diamines may be used in combination with conventional aromatic diamines. Examples of conventional diamines include 4,4'-diaminodiphenyl ether, 4,4'-diaminodiphenyl methane, 4,4'-diaminodiphenyl sulfone, 3,3'-diaminodiphenyl sulfone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis(m-aminophenoxy)benzene, and 1,3-bis(p-aminophenoxy)benzene.

The epoxy resins which may be used herein contain two or more epoxy groups having the following formula:

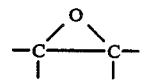

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as II:

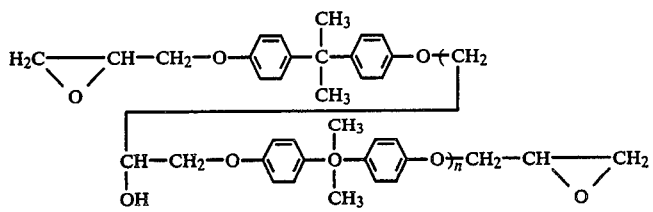

where n has a value from about 0 to about 15. These epoxides are bisphenol-A epoxy resins. They are available commercially under the trade names such as "Epon 828," "Epon 1001", and "Epon 1009" from Shell Chemical Co., and as "DER 331", and "DER 334" from Dow Chemical Co. The most preferred bisphenol A epoxy resins have an "n" value between 0 and 10.

Polyepoxides which are polyglycidyl ethers of 4,4'-dihydroxydiphenylmethane, 4,4'-dihydroxydiphenylsulfone, 4,4'-biphenol, 4,4'-dihydroxydiphenyl sulfide, phenolphthalein, 4,2'-biphenol, or tris(4-hydroxyphenyl) methane and the like are useful in this invention. In addition, EPON 1031 (a tetraglycidyl derivative of 1,1,2,2,-tetrakis(hydroxyphenyl)ethane obtained (obtained from Shell Chemical Company), and Apogen 101, (a methylolated bisphenol A resin (obtained from Schaefer Chemical Co.) may also be used. Halogenated polyglycidyl compounds such as D.E.R. 580, a brominated bisphenol A epoxy resin (obtained from Dow Chemical Company) may also be used. Other suitable epoxy resins include polyepoxides prepared from polyols such a pentaerythritol, glycerol, butanediol or trimethylol propane and an epihalohydrin.

Polyglycidyl derivatives of phenol-formaldehyde novolaks such as III where n=0.1 to 8 and cresol-formaldehyde novolaks such as IV where n=0.1 to 8 are also usable.

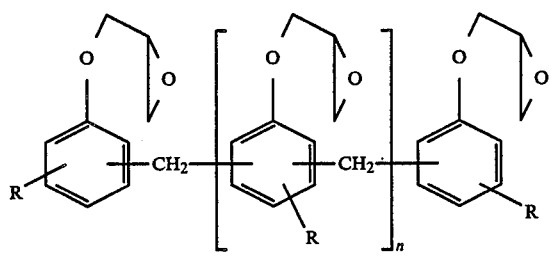

II R=H

IV R=CH₃

The former are commercially available as D.E.N. 431, D.E.N. 438, and D.E.N. 485 (obtained from Dow Chemical Co.). The latter are available as, for example, ECN 1235, ECN 1273, and ECN 1299 (obtained from Ciba Geigy Corporation, Ardsley, NY.) Epoxidized novolaks made from bisphenol A and formaldehyde such as SU-8 (obtained from Celanese Polymer Specialties Company, Louisville, KY) are also suitable.

Other polyfunctional active hydrogen compounds besides phenols and alcohols may be used to prepare the polyglycidyl compounds of this invention. These include amines, amino alcohols and polycarboxylic acids.

Adducts derived from amines include N,N-diglycidyl aniline, N,N-diglycidyl toluidine, N,N,N',N'-tetraglycidylxylylene diamine, N,N,N',N'-tetraglycidyl-bis(-methylamino) cyclohexane, N,N,N',N'-tetraglycidyl-4,4'-diaminodiphenyl methane, N,N,N',N'-tetraglycidyl-3,3'-diamino diphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, CA), Araldite MY-720 (obtained from Ciby Geigy Corporation) and PGA-X and PGA-C (obtained from the Sherwin Williams Co., Chicago, IL).

Suitable polyglycidyl adducts derived from amino alcohols include O,N,N-triglycidyl-4-amino phenol, available as Araldite 0500 or Araldite 0510 (obtained from Ciba Geigy Corporation). Also, O,N,N-triglycidyl-3-amino phenol may be used.

Also suitable for use herein are the glycidyl esters of carboxylic acids. Such glycidyl esters include, for example, diglycidyl phthalate, diglycidyl isophthalate, diglycidyl terephthalate and diglycidyl adipate. There may be also used polyepoxides such as triglycidyl cyanurates and isocyanurates, N,N-diglycidyl oxamides, N,N'-glycidyl derivatives of hydantoins such as "XB-2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methylmethacrylate-glycidyl acrylate and 62.5:24:13.5 methylmethacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclo-pentasiloxane and the diglycidyl ether of 1,3-bis(3-hydroxypropyl)tetramethyldisiloxane are also usable.

The second group of epoxy resins is prepared by epoxidation of dienes or polyenes. Resins of this type include bis(2,3-epoxycyclopentyl) ether, V:

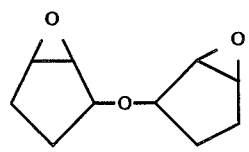

V

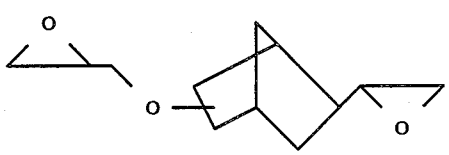

VI copolymers of V with ethylene glycol which are described in U.S. Pat. No. 3,398,102; 5(6)-2,3-epoxypropyloxy-2-(1,2,-epoxyethyl)bicyclo [2.2.1] heptane, VI; and dicyclopentadiene diepoxide. Commercial examples of these types of epoxides include vinylcyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexane-metadioxane, e.g., "ERL-4234" (obtained from Union Carbide Corp.), and epoxidized polybutadiene, e.g., "Oxiron 2001" (obtained from FMC Corp.).

Other suitable cycloaliphatic epoxides include those described in U.S. Pat. Nos. 2,750,395; 2,890,194; and 3,318,822, and the following:

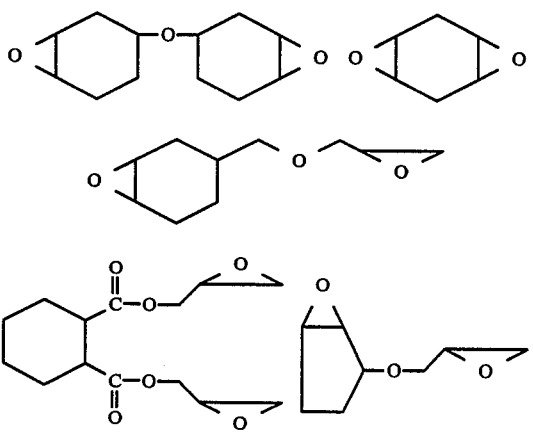

Other suitable epoxides include

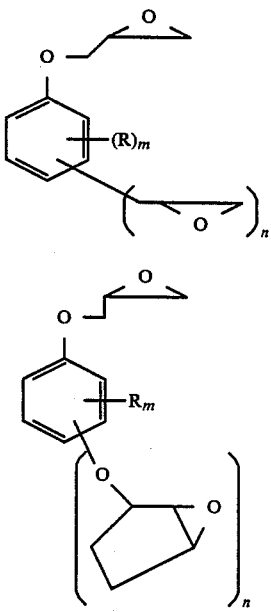

where n is 1 to 4, m is (5-n), and R is selected from H, halogen, or $C_1$ to $C_4$ alkyl.

The preferred epoxy resins are bis(2,3-epoxycyclopentyl)ether, bisphenol A epoxy resins of formula II where n is between 0 and 5, epoxidized novolak resins of formula III and IV where n is between 0 and 3, mixtures of bis(2,3-epoxycyclopentyl)ether with II, III, or IV, and N,N,N',N'-tetraglycidyl 4,4'-diamino diphenyl methane.

The thermoplastic polymers used in this invention include polyarylethers of formula VII which are described in U.S. Pat. Nos. 4,108,837 and 4,175,175.

     VII wherein R is the residuum of a dihydric phenol such as bisphenol A, hydroquinone, resorcinol, 4,4'-biphenol, 4,4'-dihydroxydiphenyl sulfone, 4,4'-dihydroxydiphenyl sulfide, 4,4'-dihydroxy-3,3',5,5'-tetramethyldiphenyl sulfide, and the like, R' is the residuum of a benzenoid compound susceptible to nucleophilic aromatic substitution reactions such as 4,4'-dichlorodiphenyl sulfone, 4,4'-difluorobenzophenone, and the like. The average value of n is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxylethers of formula VIII.

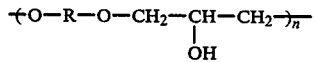     VIII where R has the same meaning as for Formula VII and the average value of n is between about 8 and about 300; and, polycarbonates such as those based on bisphenol A, tetramethyl bisphenol A, 4,4'-dihydroxydiphenyl sulfone, 4,4'-dihydroxy-3,3',5,5'-tetramethyldiphenyl sulfone, hydroquinone, resorcinol, 4,4'-dihydroxy-3,3',5,5'-tetramethyl diphenyl sulfide, 4,4'-biphenol, 4,4'-dihydroxydiphenyl sulfide, phenolphthalein, 2,2,4,4-tetramethyl-1,3-cyclobutane diol. and the like. Other suitable thermoplastics include poly(ε-caprolactone); polybutadiene; polybutadiene/acrylonitrile copolymers, including those optionally containing amine, carboxyl, hydroxyl, or —SH groups; polyesters, such as poly(butylene terephthalate); poly(ethylene terephthalate); polyetherimides such as the Ultem resins (obtained from the General Electric Company); acrylonitrile/butadiene/styrene copolymers, polyamides such as nylon 6, nylon 6,6, nylon 6,12, and Trogamid T (obtained from Dynamit Nobel Corporation; poly(amide imides) such as Torlon poly(amide imide) (obtained from Amoco Chemical Corporation, Napierville, IL); polyolefin, polyethylene oxide; poly butyl methacrylate; impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acids: amine complexes such as $BF_3$.monoethylamine, $BF_3$.piperdine, and $BF_3$.2-methylimidazole; amines, such as imidazole, 4-ethyl-2-methylimidazole, 1-methylimidazole, 2-methylimidazole, and N,N-dimethylbenzylamine; acid salts of tertiary amines, such as the p-toluene sulfonic acid:imidazole complex; and dicyandiamide.

The structural fibers which are useful in this invention include carbon, graphite, glass, silicon carbide, poly(benzothiazole), poly(benzimidazole), poly(benzoxazole), alumina, titania, and other ceramic fibers, boron, and aromatic polyamides. These fibers are characterized by a tensile strength of greater than 100,000 psi, a tensile modulus of greater than two million psi, and a decomposition temperature of greater than 200° C. The fibers may be used in the form of continuous tows (1000 to 300,000 filaments each), woven cloth, whiskers, chopped fiber or random mat. The preferred fibers are polyacrylonitrile-based carbon fibers, aromatic polyamide fibers, such as Kevlar 49 fiber (obtained from E.I. duPont de Nemours, Inc. Wilmington, DE), and silicon carbide fibers.

The compositions contain 5 to 60 weight percent, preferably 15 to 50 percent, of hardener (i.e., component a), 10 to 60 percent, preferably 15 to 50 percent, of component b, and 1 to 25 percent, preferably 2 to 20 percent by weight of component c. When used in combination with a reinforcing fiber, the resinous portion (i.e., a+b+c) comprises between about 15 to about 95 percent by weight of the composition.

In a preferred embodiment, the compositions of this invention are used to make prepreg-a ready-to mold sheet of reinforcement impregnated with partially advanced or 'B-staged' resin. Prepreg may be prepared by several techniques known in the art, such as wet winding or hot melt. One way of making impregnated tow or undirectional tape involves passing the fiber through a bath of the epoxy/hardener/thermoplastic mixture. A non-reactive, volatile solvent such as dichloroethane may optionally be included in the resin bath to reduce viscosity. After impregnation, the reinforcement is passed through a die to remove excess resin, sandwiched between plies of release paper, passed through a set of heated rollers, cooled, and taken up on a spool.

Alternatively, prepreg may be made by two step process, which in the first step, involves coating a thin film of the epoxy/hardener/thermoplastic mixture on release paper. In the second step, a ribbon of fibers is sandwiched between two plies of coated release paper and then subjected to heat and pressure for a short period to melt the resin into the fibers. After one ply of release paper is removed, the impregnated tape is wound up on a spool, using the other ply of release paper as a spacer.

During both methods of prepreg manufacture, the resin partially advances. Typically prepreg is stored at 0° F. or below to retard the rate of resin advancement.

In some applications it may be desirable to prereact a portion of the epoxy resin with the hardner prior to prepreg manufacture. For example, if an epoxy blend containing 80 percent by weight of bis(2,3-epoxycyclopentyl)ether and 20 percent of a liquid bisphenol A resin is reacted with 4,4'-bis-(4-amino phenoxy)diphenyl sulfone, it is beneficial to prereact the hardener with the bisphenol A epoxy resin prior to addition of bis(2,3-epoxycyclopentyl)ether. The prereacted epoxy/hardener mixture has a lower melting point than the pure hardener, making it easier to blend with the remaining portion of the epoxy blend.

Composites may be prepared by curing preimpregnated reinforcement using heat and pressure. Vacuum bag/autoclave cures work well with these reinforced compositions. Laminates may also be prepared via wet layup followed by compression molding, resin transfer molding, or by resin injection, as described in European Patent Application Publication No. 0019149 published Nov. 26, 1980. Typical cure temperatures are 100° F. to 500° F., preferably 150° F. to 450° F.

The compositions of this invention are well suited for filament winding. In this composite fabrication process, continuous reinforcement in the form of tape or towe-ither previously impregnated with resin or impregnated during wnding is placed over a rotating and removable form or mandrel in a previously determined pattern. Generally the shape is a surface of revolution and contains end closures. When the proper number of layers are applied, the wound form is cured in a oven or autoclave and the mandrel removed.

For making preimpregnated tape with tack and drape, the preferred resin composition contains greater than 60 percent by weight of bis(2,3-epoxcyclopentyl)ether in the epoxide component, 4,4'-bis(3-aminophenoxy)diphenyl sulfone (i.e. I) as the hardener, and a polysulfone such as Udel polysulfone P-1800, (obtained from Union Carbide Corp.), or phenoxy resins such as UCAR Phenoxy Resin Type PKHH, (obtained from Union Carbide Corp.) as the thermoplastic modifier.

Coepoxides such as bisphenol A epoxy resins of Formula II where n=0 to 5, or epoxidized novolak resins of Formula III or IV where n=0 to 4 may be blended with bis(2,3-epoxycyclopentyl)ether for this application. If additional tack is required, glycidyl amines such as N,N-diglycidyl aniline or N,N,N',N'-tetraglycidyl-4,4'-diaminodiphenyl methane may be used as a coepoxide. In general, prepreg shelf life increases as the proportion of cycloaliphatic epoxy resin in the epoxy component increases.

If tack and drape retention over a period of several days is not required, 4,4'-bis(4-aminophenoxy)diphenyl sulfone or 4-(3-aminophenoxy)-4'-(4-aminophenoxy)diphenyl sulfone may be used as the hardener.

For filament winding and wet layup, the preferred resin composition comprises epoxy resins selected from bis(2,3-epoxycyclopentyl)ether, bisphenol A epoxy resins of Formula II, where n equals 0 to 6, and epoxidized novolak resins of Formulas III and IV where n equals 0 to 3; a hardener selected from 4,4'-bis(3-aminophenoxy)diphenyl sulfone, 4,4'-bis(4-aminophenoxy)diphenylsulfone, and 4(3-aminophenoxy)-4'-(4-aminophenoxy sulfone; and a thermoplastic selected from Udel P-1800 polysulfone or Ucar Phenoxy PKHH polyhydroxyether. The preferred formulations have viscosities of less than 50,000 centipoises at 70° C. Consequently, bis(2,3-epoxycyclopentyl)ether may be completely replaced by other epoxy resins in some preferred formulations.

For all prepreg and composite formulations, the preferred molar ratio of N—H groups in the hardener to 1,2-epoxide groups in the epoxy resin is 0.6 to 1.5. All thermoplastics used in this invention have number average molecular weights above 1500, and preferably above 2000.

Although desirable from a processing point of view, it is not essential that the epoxide/hardener/thermoplastic mixture be homogeneous. If incompatible thermoplastics are used, they should be ground so that they pass through a 30 mesh screen, preferably a 50 mesh screen. When cured, the thermoplastic component may or may not be optically compatible with the epoxide/hardener phase.

The compositions of this invention may be used to prepare composites for use as aircraft parts such as wing skins, wing-to-body fairings, floor panels, flaps, and radomes; as automotive parts such as driveshafts, bumpers, and springs, and as pressure vessels, tanks and pipes. These composites also suitable for protective armor on military vehicles and sporting goods applications such as golf shafts, tennis rackets, and fishing rods.

In addition to their use as matrix resins, these compositions are also suitable for coatings, adhesives, and potting compounds.

EXAMPLES

The following examples serve to give specific illustrations of the practice of this invention but they are not intended in any way to limit the scope of this invention.

The following designations used in the Examples have the following meaning:

The epoxy equivalent weight (EEW) is the grams of epoxy resin per mole of 1,2-epoxide group.

Polysulfone: a polymer of the following formula:

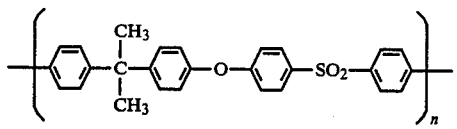

Udel Polysulfone P-1800 (obtained from Union Carbide Corporation) having a number average molecular weight of about 24,000.

Phenoxy: a polymer with the following formula:

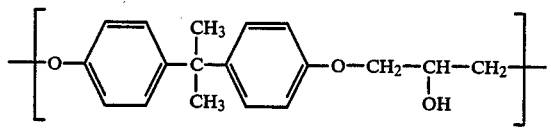

Ucar Phenoxy PKHH (obtained from Union Carbide Corporation) having a number average molecular weight of about 24,000.

EXAMPLE 1

A solution was prepared by blending 394 g of Polysulfone with 2400 g of bis(2,3-epoxycyclopentyl)ether and 600 g of Dow D.E.N. 438 epoxidized novolak resin at 120° C. for 1 hour. A 2305 g portion of this solution was blended with 2195 g of 4,4'-bis(3-aminophenoxy)-diphenyl sulfone to produce a thermosetting epoxy resin formulation.

EXAMPLE 2

A solution was prepared by combining 480 g of bisphenol A epoxy resin (EEW 189) and 720 g of bis(2,3-epoxycyclopentyl)ether. 147 g of Polysulfone was dissolved in the epoxy blend by heating and stirring the mixture at 130° C. for 1 hour. A thermosetting epoxy resin formulation was prepared by blending a 1101 g portion of the Polysulfone/epoxy blend with 900 g of 4,4'-bis-(3-aminophenoxy)diphenyl sulfone.

EXAMPLE 3

A solution of Polysulfone in epoxy resin was prepared by heating a mixture of 1776 g of bis(2,3-epoxycyclopentyl)ether, 445 g of bisphenol A epoxy resin (EEW 525) and 148 g of Polysulfone at 130° C. for 1.2 hours. A thermosetting epoxy resin formulation was prepared by combining a 1333 g portion of the Polysulfone/epoxy blend with 1167 g of 4,4'-bis(3-aminophenoxy)diphenyl sulfone.

EXAMPLE 4

A solution of Polysulfone in bis(2,3-epoxycyclopentyl)ether was prepared by heating 181.5 g of Polysulfone with 1100 g of the diepoxide for 1.5 hours at 130° C. This solution was cooled to 70° C. and was blended with 137.5 g of a bisphenol A epoxy resin (EEW 240) and 137.5 g of N,N-diglycidyl ortho-toluidine (Glyamine 135, from F.I.C. Corp. San Francisco, CA). A thermosetting epoxy resin formulation was prepared by combining a 1334 g portion of this solution with 1138 g of 4,4'-bis(3-aminophenoxy)diphenyl sulfone.

EXAMPLE 5

A 5 liter flask equipped with a paddle stirrer, nitrogen inlet, thermometer with a Thermo-o-Watch controller, Claisen adapter, 12-inch jacketed Vigreux column. Barrett trap, water cooled condenser, a nitrogen inlet, and an electric heating mantle was charged with the following materials:

415 g of potassium carbonate
574 g of 4,4-dichlorodiphenyl sulfone
600 ml of toluene, and
1400 ml of N,N-dimethyl acetamide.

The mixture was stirred, purged with nitrogen, and heated to 80° C. Then 229 g of m-aminophenol and 229 g of p-aminophenol were added. The temperature of the mixture was raised to 155°–160° C. and held there as toluene and a toluene/water azeotrope were collected in the trap. A small amount of toluene was continually recycled as the mixture was maintained at 160° C. for 10 hours.

The mixture was then cooled to 70° C. and filtered. A 350 g portion of the filtrate was then charged to a 5 liter flask containing 2 liters of methanol. This solution was heated and stirred at reflux as 1300 g of water was added over a 1 hour. period. Following addition of water, heating was discontinued, but agitation continued as the contents cooled to room temperature (about 25° C.).

The cooled mixture contained a tan granular solid, which was recovered on a filter, washed once with hot water, and dried in a vacuum oven. The final product weighed 133 g and had a melting range of 150°–163° C. It was a mixture of 4,4'-bis(4-aminophenoxy)diphenyl sulfone, 4,4'-bis(3-aminophenoxy)diphenyl sulfone and 4-(3-aminophenoxy)-4'-(4-aminophenoxy)diphenyl sulfone.

EXAMPLE 6

A solution of bisphenol A polyhydroxyether in bis(2,3-epoxycyclopentyl)ether was prepared by heating and stirring 200 g of Phenoxy with 1466 g of the diepoxide at 120° C. for 1.8 hr. The resulting solution was cooled to 70° C. and blended with 366 g of N,N-diglycidyl ortho-toluidine (Glyamine 135). A thermosetting resin formulation was prepared by combining 70.0 g of this thermoplastic/epoxy resin blend with 70.0 g of 4,4'-bis(3-aminophenoxy)diphenyl sulfone.

EXAMPLES 7 TO 11

Unreinforced castings were prepared from the formulations described in Examples 1 through 4 and 6. Typical castings weighed 100 to 160 g and were made using the proportions giving in the above Examples. Casting dimensions were ⅛×8×5 to 8 inches.

The general procedure for making castings was as follows: The epoxy resin and thermoplastic were charged to a 3-necked flask equipped with a paddle stirrer. The contents of the flask were heated to 120° C. to 130° C. and stirred. The amine hardener was added to this solution as a fine powder. It dissolved in about five minutes. The resulting solution was subjected to a vacuum of about 25 inches of mercury for three minutes with agitation, followed by two minutes without agitation. It was then poured into a glass mold with a cavity of dimensions ⅛"×8"×8", and cured with a programmed heating cycle: 16 to 21 hours at 105° C., 8 hours at 140° C., and finally 16 hours at 175° C.

Castings were tested to determine tensile properties, heat deflection temperature and water sensitivity. For the latter, the change in weight on immersion of tensile bars in 160° F. water after two weeks was recorded. Tensile properties were measured according to ASTM D-638 using a Type 1 dogbone specimen. Heat deflection temperatures were measured according to ASTM D-648 (264 psi stress).

Table I summarizes the properties of unreinforced castings. These materials have low water sensitivity, high tensile strengths, and high tensile moduli compared to castings of many other epoxy formulations.

TABLE I
PROPERTIS OF UNREINFORCED CASTINGS

| | CASTING EXAMPLE | | | | |
|---|---|---|---|---|---|
| | 7 | 8 | 9 | 10 | 11 |
| RESIN FORMULATION EXAMPLE | 1 | 2 | 3 | 4 | 6 |
| TENSILE STRENGTH ($10^3$psi) | 10.1 | 8.3 | 11.7 | 11.2 | 11.9 |
| TENSILE MODULUS ($10^5$psi) | 5.7 | 6.1 | 5.7 | 5.9 | 6.1 |
| ELONGATION (%) | 2.0 | 1.6 | 2.5 | 2.2 | 2.3 |
| HEAT DEFLECTION TEMPERATURE (°C.) | 173 | 169 | 166 | 181 | 158 |
| WATER UPTAKE (%)$^a$ | 3.0 | 2.2 | 2.4 | 2.5 | 2.5 |

$^a$AFTER IMMERSION FOR 2 WKS AT 160°F.

Example 12 describes the preparation of undirectional epoxy/graphite prepreg.

EXAMPLE 12

The epoxy resin formulation described in Example 1 was heated in a flask under nitrogen at 120°±5° C. for 70 minutes in order to partially advance it. After the solution was cooled to 80° C. over a 40 minute period, it was coated on 8 inch wide release paper (type 2-BKG-1 and 99D, obtained from Daubert Coated Products, Dixon, Ill.) at a coating weight of about 0.012 lb/sq. ft.

Six inch wide undirectional prepreg tape was made by forming a ribbon from 74 tows of carbon fiber and contacting it between two plies of epoxy coated release paper in a prepreg machine. In the prepreg machine, the sandwich of fiber and coated release paper passed over a series of heated rollers to melt the resin into the fibers. The finished tape contained about 45 percent by weight of fiber.

EXAMPLES 13 THROUGH 15

Six inch wide undirectional prepreg tape was prepared using the resin formulations in Examples 2, 3, and 4. A control prepreg (Control A) was also made. The general procedure is described in Example 12. The heat history of each formulation prior to coating is summarized in Table II.

TABLE II

| | Example No. | | | CONTROL A |
|---|---|---|---|---|
| | 13 | 14 | 15 | |
| Example for resin formulation | 2 | 3 | 4 | —$^a$ |
| Preadvancement Conditions | 30 min. 115°±° C. | 60 min. 115°±5° C. | 80 min. 120°±5° C. | 60 min. 105°±5° C. |

$^a$A state-of-the-art prepreg resin formulation of: 100 parts N,N,N',N'—tetraglycidyldiphenyl methane (MY-720. from Ciba-Geigy Corp.) 13 parts bisphenol A epoxidized novolak (SU-8, from Celanese Polymer Specialties Company. Louisville, KY), and 32 parts 4.4'-diaminodiphenyl sulfone

EXAMPLES 16 THROUGH 19

Examples 16 through 19 describe the cured laminates made from the prepreg in Examples 12 through 15. The laminates were cured in an autoclave using bleeder cloths to absorb excess resin. Between 5 and 10 plies of prepreg was used to make each specimen. Tensile properties were measured according to ASTM-D3039. Compressive properties were measured using a modified ASTM-D695 procedure. Unidirectional graphite/epoxy tabs were added to prevent the sample ends from crushing in a noncompressive failure mode. A gage length of approximately 0.190 inches was used. End tabs on compressive samples were adhered using FM-300 film adhesive (obtained from American Cyanamid Company, Havre de Grace, MD), which was cured at 177° C. for 1 hr.

Table III summarizes the longitudinal properties measured on undirectional laminates. It is clear that these compositions have excellent tensile and compressive properties. The tensile properties of laminates made with Fiber B are significantly higher for the resin formulations of this invention than for the laminate made with the Control resin.

EXAMPLES 20 THROUGH 22

Examples 20 through 22 show compressive strengths after impact of quasiisotropic laminates fabricated with the compositions of this invention. This test measures the damage tolerance of composites. The latter depends on the choice of matrix resin. All test specimens were made with Fiber B and had dimensions of 6×4×approximately 0.2 inches. The panels were impacted in the center with a Gardner type Impact Tester (Gardner Laboratories, Bethesda, MD) having a ⅝ inch diameter spherical indenter. The impact was normal to the plane of the fibers. When impacted, the laminate was simply supported over a 3 inch by 5 inch cut out in an aluminum plate with a plywood backup. The impacted panel was tested for residual compressive strength in a steel fixture that constrained the edges from out-of-plane buckling.

In this test, residual compressive strengths decrease as the impact load increases. The preferred samples have the highest residual compressive strengths at a given impact level.

It is clear that the residual compressive strengths of laminates made with the compositions of this invention are significantly higher than that of the control. Thus, the compositions of this invention have improved damage tolerance.

TABLE III

PROPERTIES OF UNIDIRECTIONAL LAMINATES[a]

| | EXAMPLE | | | | CONTROL |
|---|---|---|---|---|---|
| | 16 | 17 | 18 | 19 | |
| PREPREG EXAMPLE | 12 | 13 | 14 | 15 | — |
| CURE SCHEDULE[b] | II | I | III | III | II |
| PROPERTIES | | | | | |
| TENSILE STRENGTH ($10^3$ psi) | 341 | 231 | 371 | 327 | 272 |
| TENSILE MODULUS ($10^6$ psi) | 19.2 | 18.6 | 19.3 | 19.6 | 20.1 |
| STRAIN TO FAILURE (%) | 1.66 | 1.21 | 1.70 | 1.51 | 1.29 |
| COMPRESSIVE STRENGTH ($10^3$ psi) | 199 | 237 | — | — | 220 |
| FIBER TYPE[c] | B | A | B | B | B |

[a]Normalized to 60 volume percent fiber

[b]
| Cure Schedule I | Cure Schedule II | Cure Schedule III |
|---|---|---|
| Room temperature to 135° C. at 2° C./min | Apply vaccuum room temperature to 135° C. at 2° C./min | Same as Cure Schedule II plus 4 hr. posture at 200° C. |
| Hold 90 min at 135° C. | Apply 90 psi pressure | |
| Apply 85 psi pressure | Hold at 135° C. for 3 hrs | |
| Hold 105 min at 135° C. | 135 to 179° C. at 1° C./min | |
| 135° C. to 179° C. at 1° C./min | Hold 4 hrs at 179° C. | |
| Hold at 179° C. for 2 hrs. | | |

[c]FIBER A: PAN-Based carbon fiber, 6K, tensile strength: $5.0 \times 10^5$ psi; tensile modulus: 34 million psi, yield: 0.39 gram/meter
Fiber B: PAN-Based carbon fiber, 6K, tensile strength $6.6 \times 10^5$ psi; tensile modulus: 34 million psi, yield: 0.3 grams/meter

TABLE IV

COMPRESSIVE STRENGTH (in $10^3$ psi) AFTER IMPACT RESULTS

| | EXAMPLE | | | CONTROL |
|---|---|---|---|---|
| | 20 | 21 | 22 | 30 |
| PREPREG EXAMPLE | 12 | 14 | 15 | — |
| COMPOSITE PROPERTIES | | | | |
| FIBER CONTENT (vol %) | 50.7 | 60.2 | 54.5 | 56.9 |
| THICKNESS (IN) | .222 | .171 | .189 | .205 |
| LAYUP | 36 ply[b] | 32 ply[c] | 32 ply[c] | 36 ply[b] |
| IMPACT LEVEL (in LB/IN) | | | | |
| 0 | 67.9[d] | — | — | 72.7[d] |
| 1000 | 42.8 | — | — | 23.6 |
| 1500 | 36.6 | 33.8 | 32.1 | 20.7[d,e] |

[a]Cure schedule:
Apply vaccuum
Heat from room temperature to 135° C. at 2° C./min
Apply 90 psi
Hold 3 hr. at 135° C.
Heat from 135° C. to 179° C. at 1° C./min
Hold 4 hr. at 179° C.
Post Cure 4 hr. at 200° C.
[b][(±45/0/90/90)$_2$±45/0/90/±45]s
[c](45/90/−45/0) 4s
[d]No post cure (200° C.)
[e]Post cure found to have no effect at the 1000 in. lb/in impact level

What is claimed is:

1. A composition comprising:
(a) from 5 to 60 wt% of a diamine hardener represented by the following general formula:

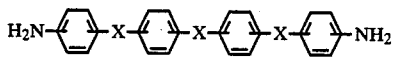

wherein the X's are independently selected from a direct bond, O, S, $SO_2$, CO, COO, $C(CF_3)_2$, $C(CR_1R_2)_2$ wherein $R_1$ and $R_2$ are independently hydrogen or alkyl of 1 to 4 carbon atoms,
(b) from 10 to 60 wt% of an epoxy resin containing two or more 1,2-epoxy groups per molecule, and
(c) from 1 to 25 wt% of a thermoplastic polymer, and which contains a structural fiber selected from carbon, glass, silicon carbide, poly(benzothiazole), poly(benzimidazole), poly(benzoxazole), alumina, titania, boron, and aromatic polyamides.

2. A composition comprising:
(a) from 5 to 60 wt% of a diamine hardener represented by the following general formula:

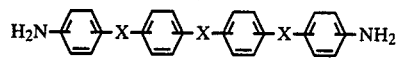

wherein the X's are independently selected from a direct bond, O, S, $SO_2$, CO, COO, $C(CF_3)_2$, $C(CR_1R_2)_2$ wherein $R_1$ and $R_2$ are independently hydrogen or alkyl of 1 to 4 carbon atoms,
(b) from 10 to 60 wt% of bis(2,3-epoxycyclopentyl)ether, and
(c) from 1 to 25 wt% of a thermoplastic polymer, which contains a structural fiber.

3. A prepreg comprising:
(a) from 5 to 60 wt% of a diamine hardener represented by the following general formula:

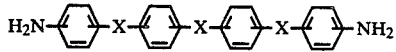

wherein the X's are independently selected from a direct bond, O, S, $SO_2$, CO, COO, $C(CF_3)_2$, $C(CR_1R_2)_2$ wherein $R_1$ and $R_2$ are independently hydrogen or alkyl of 1 to 4 carbon atoms,
(b) from 10 to 60 wt% of an epoxy resin containing two or more 1,2-epoxide groups per molecule,
(c) from 1 to 25 wt% of a thermoplastic polymer and
(d) from 5 to 85 wt% of a structural fiber.

4. A prepreg as defined in claim 3 which contains an accelerator which increases the rate of cure.

5. A composite comprising:
(a) from 10 to 60 wt% of a cured epoxy resin containing two or more 1,2-epoxide groups per molecule hardened with
(b) from 5 to 60 wt% of a diamine hardener represented by the following general formula:

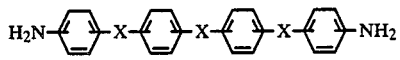

wherein the X's are independently selected from a direct bond, O, S, SO$_2$, CO, COO, C(CF$_3$)$_2$, C(CR$_1$R$_2$)$_2$ wherein R$_1$ and R$_2$ are independently hydrogen or alkyl of 1 to 4 carbon atoms,
(c) from 1 to 25 wt% of a thermoplastic polymer, and
(d) from 5 to 85 wt% of a structural fiber.

6. A composite as defined in claim 5 wherein the epoxy resin was cured in the presence of an accelerator which increased the rate of cure.

* * * * *